(12) United States Patent
Shin et al.

(10) Patent No.: US 10,114,244 B2
(45) Date of Patent: Oct. 30, 2018

(54) CURVED DISPLAY DEVICE

(71) Applicant: Samsung Display Co., LTD., Yongin-si, Gyeonggi-Do (KR)

(72) Inventors: Jaiku Shin, Hwaseong-si (KR); Mingu Kim, Seoul (KR); Seongsik Ahn, Yongin-si (KR)

(73) Assignee: Samsung Display Co., LTD., Gyeonggi-Do (KR)

( * ) Notice: Subject to any disclaimer, the term of this patent is extended or adjusted under 35 U.S.C. 154(b) by 56 days.

(21) Appl. No.: 15/066,485

(22) Filed: Mar. 10, 2016

(65) Prior Publication Data

US 2016/0306204 A1 Oct. 20, 2016

(30) Foreign Application Priority Data

Apr. 16, 2015 (KR) .......................... 10-2015-0053978

(51) Int. Cl.
*G02F 1/1333* (2006.01)

(52) U.S. Cl.
CPC .................. *G02F 1/133308* (2013.01); *G02F 2001/133317* (2013.01)

(58) Field of Classification Search
CPC ............................................... G02F 1/133308
See application file for complete search history.

(56) References Cited

U.S. PATENT DOCUMENTS

| 6,631,016 B1 * | 10/2003 | Klug ........................ G03H 1/26 359/22 |
| 6,906,860 B2 * | 6/2005 | Starkweather ......... G03B 21/62 348/389.1 |
| 2002/0027636 A1 | 3/2002 | Yamada |
| 2005/0117197 A1 * | 6/2005 | Ide ......................... G02F 1/1333 359/291 |
| 2006/0273304 A1 * | 12/2006 | Cok .................... H01L 51/0096 257/40 |
| 2007/0002130 A1 * | 1/2007 | Hartkop ................. H04N 7/141 348/14.16 |
| 2009/0015747 A1 * | 1/2009 | Nishizawa ........ G02F 1/133308 349/58 |

(Continued)

FOREIGN PATENT DOCUMENTS

| KR | 101319543 B1 | 10/2013 |
| KR | 1020140002243 A | 1/2014 |

(Continued)

*Primary Examiner* — Sang V Nguyen
(74) *Attorney, Agent, or Firm* — Cantor Colburn LLP

(57) ABSTRACT

A curved display device includes a display panel having a curved shape, and including a first segment, a second segment, and a third segment that are sequentially defined along a curved edge in the display panel, a support member combined with the display panel to support the curved shape of the display panel, and a spacer placed in correspondence with the second segment of the first to third segments and disposed between the display panel and the support member, where the display panel is curved with a first curvature radius along a first direction in the second segment, where the display panel is shaped in at least one of a flat form in each of the first and third segments, and a curved form with a second curvature radius that is larger than the first curvature radius.

17 Claims, 9 Drawing Sheets

(56) References Cited

U.S. PATENT DOCUMENTS

| | | | | |
|---|---|---|---|---|
| 2009/0115933 A1* | 5/2009 | Mimura | | G02F 1/133512 |
| | | | | 349/59 |
| 2009/0201443 A1* | 8/2009 | Sasaki | | G02F 1/1333 |
| | | | | 349/70 |
| 2010/0073593 A1* | 3/2010 | Sasaki | | B29D 11/00 |
| | | | | 349/58 |
| 2010/0073620 A1* | 3/2010 | Yamaguchi | | G02F 1/133305 |
| | | | | 349/160 |
| 2010/0124603 A1* | 5/2010 | Ito | | H01L 27/3246 |
| | | | | 427/66 |
| 2010/0128112 A1* | 5/2010 | Marti | | G06F 3/011 |
| | | | | 348/51 |
| 2010/0188422 A1* | 7/2010 | Shingai | | G06F 3/016 |
| | | | | 345/647 |
| 2012/0020056 A1* | 1/2012 | Yamagata | | G02F 1/133308 |
| | | | | 362/97.1 |
| 2013/0002572 A1* | 1/2013 | Jin | | G02F 1/133305 |
| | | | | 345/173 |
| 2013/0321740 A1* | 12/2013 | An | | H05K 5/0217 |
| | | | | 349/58 |
| 2015/0277131 A1* | 10/2015 | Park | | G02B 27/2221 |
| | | | | 349/58 |

FOREIGN PATENT DOCUMENTS

| KR | 1020140141400 A | 12/2014 |
|---|---|---|
| KR | 1020160035132 A | 3/2016 |
| KR | 1020150114623 B1 | 6/2017 |

* cited by examiner

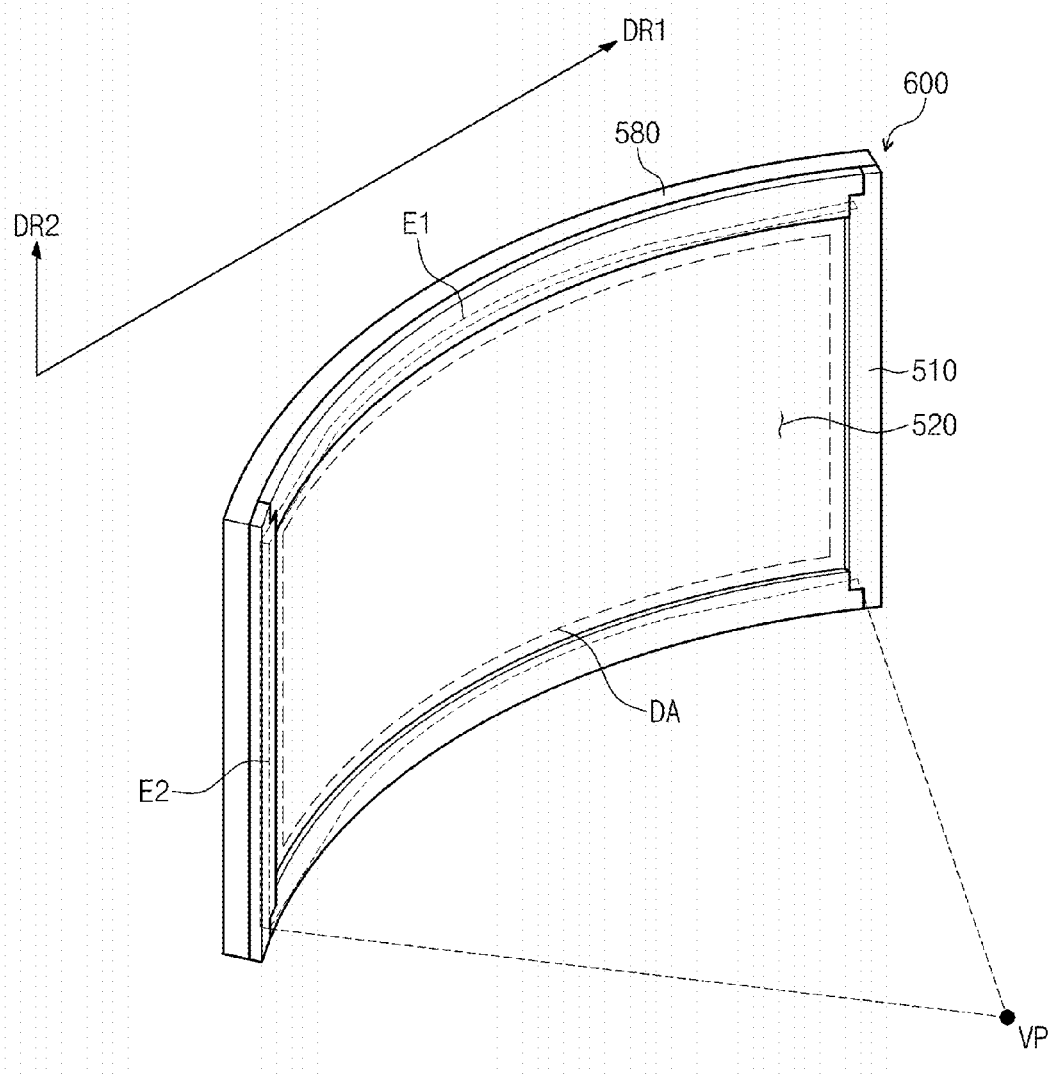

Each length of 1st and 3rd sectors = 50mm
Spacer thickness = 0.85mm
Mura index = 5.01

Each length of 1st and 3rd sectors = 50mm
Spacer thickness = 1.95mm
Mura index = 3.78

Each length of 1st and 3rd sectors = 50mm
Spacer thickness = 3.80mm
Mura index = 2.70

CURVED DISPLAY DEVICE

This application claims priority to Korean Patent Application No. 10-2015-0053978, filed on Apr. 16, 2015, and all the benefits accruing therefrom under 35 U.S.C. § 119, the content in its entirety is herein incorporated by reference.

BACKGROUND

1. Field

Exemplary embodiments of the invention described herein relate to a curved display device, and more particularly, relate to a curved display device including a curved display area.

2. Description of the Related Art

Flat display devices are used for displaying images in a variety of information processing apparatuses such as televisions, monitors, and mobile phones. In recent years, many developmental interests are concerned with curved display devices which are shaped having a curvature. Such curved display devices are equipped with curved display areas to provide users with improved perception of stereoscopy, immersion, and presence of images.

SUMMARY

One of exemplary embodiments of the invention is directed to provide a curved display device with improved display quality.

In an exemplary embodiment, a curved display device may include a display panel, a support member, and a spacer.

The display panel may have a curved shape, and further include a first segment, a second segment, and a third segment that are sequentially defined along a curved edge in the display panel. The support member may be combined with the display panel to support the curved shape of the display panel. The spacer may be placed in correspondence with the second segment of the first to third segments and disposed between the display panel and the support member.

In an exemplary embodiment, the display panel may be curved with a first curvature radius along a first direction in the second segment.

In an exemplary embodiment, the display panel may be shaped in at least one of a flat form in each of the first and third segments, and a curved form with a second curvature radius that is larger than the first curvature radius.

In an exemplary embodiment, the spacer may be placed in correspondence with the second segment of the first to third segments.

With a curved display device according to exemplary embodiments of the invention, it may be allowable to define an empty cavity by spacers between a part of a display panel and a support member. Accordingly, it may be achievable for the part of the display panel to maintain its flat form. Additionally, stress to the part of the display panel may be reduced to minimize an effect from a light source, which is caused by the stress, in the display panel.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 1A is a perspective view illustrating an exemplary embodiment of a curved display device according to the invention.

DETAILED DESCRIPTION

Figure 1B:
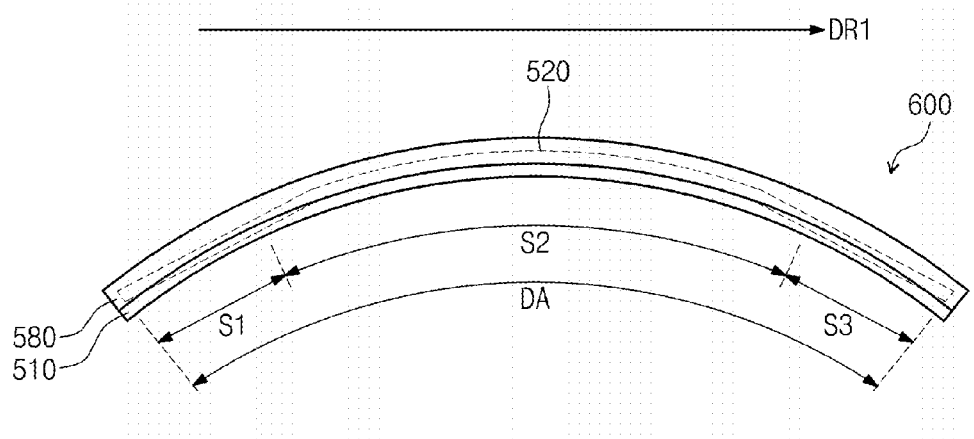
FIG. 1B is a plan view illustrating the curved display device shown in FIG. 1A.

Now hereinafter will be described exemplary embodiments of the invention in conjunction with accompanying drawings. Advantages and features of the invention, and ways for accomplishing them will be apparent from embodiments described in detail hereinafter in conjunction with the accompanying drawings. The invention, however, may be embodied in various different forms, and should not be construed as being limited only to the illustrated embodiments. Rather, these embodiments are provided as examples so that this disclosure will be thorough and complete, and will fully convey the concept of the invention to those skilled in the art. Unless otherwise noted, the same reference numerals denote the same elements throughout the attached drawings.

It will be understood that, although the terms "first", "second", "third", etc., may be used herein to describe various elements, components, areas, layers and/or sections, these elements, components, areas, layers and/or sections should not be limited by these terms. These terms are only used to distinguish one element, component, area, layer or section from another element, component, area, layer or section. Additionally, when a film, a layer, area, or element is referred to as being "on", or "over" another film, layer, area, or element, it may be comprehensible that there is also an intervening film, layer, area, or element between them.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the Figures is turned over, elements described as being on the "lower" side of other elements would then be oriented on "upper" sides of the other elements. The exemplary term "lower," can therefore, encompasses both an orientation of "lower" and "upper," depending on the particular orientation of the Figure. Similarly, if the device in one of the Figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the Figures are schematic in nature and their shapes are not intended to illustrate the precise shape of a region and are not intended to limit the scope of the present claims.

FIG. 1A is a perspective view illustrating a curved display device according to an exemplary embodiment of the invention, and FIG. 1B is a plan view illustrating the curved display device shown in FIG. 1A.

Referring to FIGS. 1A and 1B, the curved display device 600 may include a display area DA which is partly shaped in curvature along a first direction DR1. In more detail, according to the above-described exemplary embodiment, a first segment S1, a second segment S2, and a third segment S3 may be defined in sequence along a long edge E1 of the display area DA. The display area DA corresponding to the second segment S2 may be shaped in a curve. The display area DA corresponding to the first and third segments S1 and S3 may be shaped in a plane.

In the above-described exemplary embodiment, the display area DA may be shaped in a concave on a view point of a user. In another exemplary embodiment, the display area DA may be shaped in a convex on the view point VP.

In the above-described exemplary embodiment, the curved display device 600 may include a display panel 520, an accommodation member 580, and a cover member 510.

In the above-described exemplary embodiment, the display panel 520 may be a liquid crystal display ("LCD") panel, for example. However, the invention is not limited thereto, and the display panel 520 may include various other types of the display panels. The display panel 520 may receive light from a backlight assembly 500 (see FIG. 2) to display an image thereon. Additionally, as like the above-described exemplary embodiment, when the display panel 520 is an LCD panel, the curved display panel 600 may further include the backlight assembly 500 (see FIG. 2) which is disposed in the accommodation member 580 to emit light toward the display panel 520.

In the above-described exemplary embodiment, to correspond with a shape of the display area DA, the display panel 520 may be partly shaped in a curve along the first direction DR1. In more detail, when the first to third segments S1, S2, and S3 are defined along the long edge E1 of the display panel 520, the display panel 520 may be curved in a first curvature radius along the first direction DR1 in correspondence with the second segment S2. Additionally, the display panel 520 may be shapes in at least one of a flat form corresponding to the first and third segments S1 and S3, and a curved form with a curvature radius larger than the first curvature radius.

In the above-described exemplary embodiment, the long edge E1 of the display panel 520 may be curved with the first curvature radius in the second segment S2 while shaped in at least one of a straight line and a curve with a second curvature radius in the first and third segments S1 and S3. A short edge E2 of the display panel 520 may be shaped in a straight line along a second direction DR2 which substantially intersects the first direction DR1 at right angles.

The accommodation member 580 may contain the display panel 520. The cover member 510 may be coupled with the accommodation member 580 which contains the display panel 520, and shaped to open corresponding to the display area to cover the edges of the display panel 520.

Now the elements of the curved display device 600 will be described hereinafter in detail.

Figure 2:
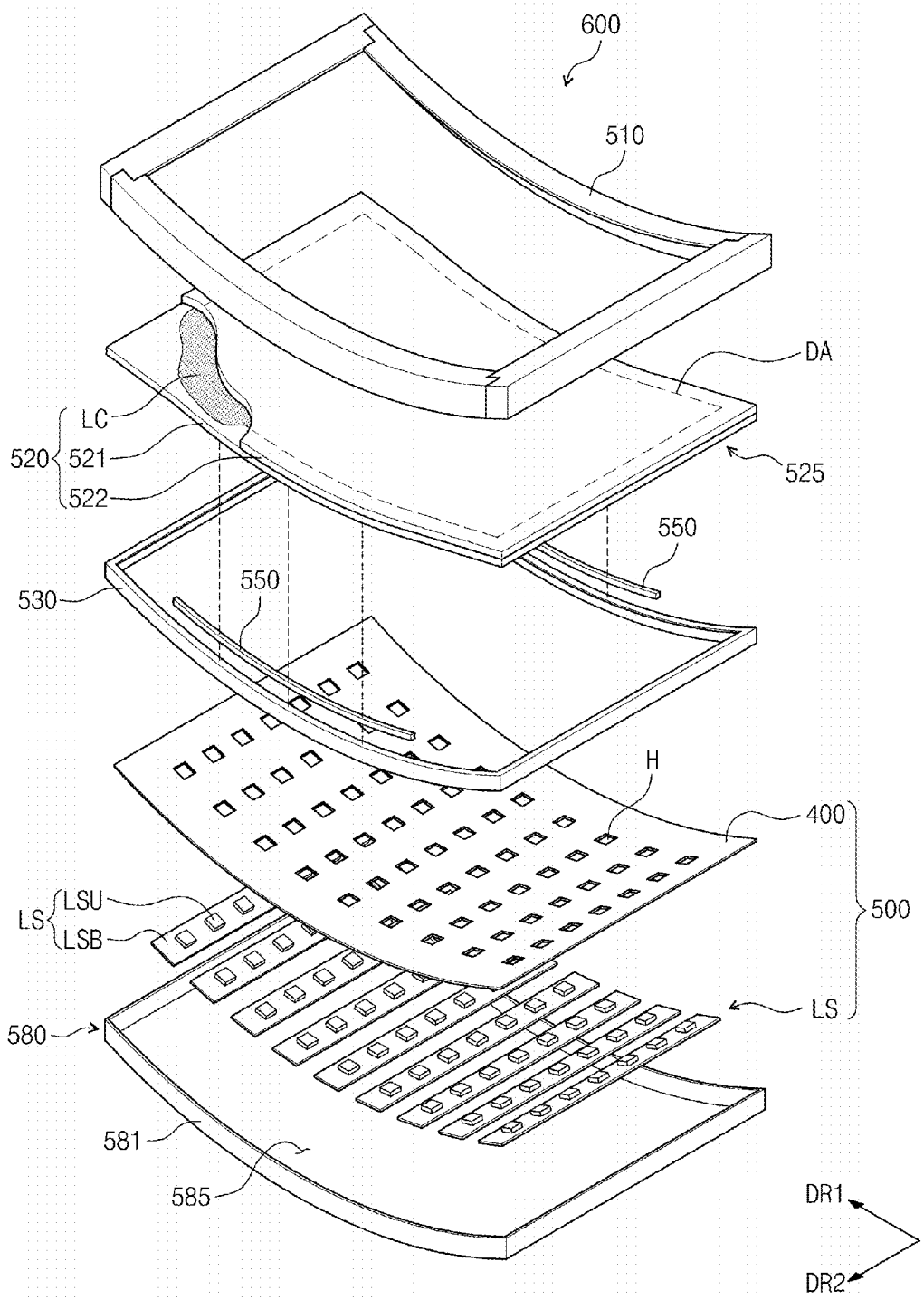
FIG. 2 is an exploded perspective view illustrating the curved display device shown in FIG. 1A.

FIG. 2 is an exploded perspective view illustrating the curved display device 600 shown in FIG. 1A.

Referring to FIG. 2, the curved display device 600 may include the display panel 520, the backlight assembly 500, the accommodation member 530, the cover member 510, and spacers 550.

The display panel 520 may be partly shaped in a curve along the first direction DR1. The display panel 520 may include a first substrate 521, a second substrate 522, and a liquid crystal layer LC. The liquid crystal layer LC may be interposed between the first and second substrates 521 and 522.

In the above-described exemplary embodiment, each of the first substrate 521 and the second substrate 522 may include a base substrate having optical transmittance. In an exemplary embodiment, the base substrate may comprise a glass or a plastic, for example.

In the above-described exemplary embodiment, the first substrate 521 may include a plurality of pixels. Each of the plural pixels may include a pixel electrode and a thin film transistor (not shown) to switch a driving signal which is provided to the pixel electrode.

In the above-described exemplary embodiment, the second substrate 522 may include a common electrode (not shown) and a color filter (not shown). The common electrode may generate an electric field, which acts on the liquid crystal layer LC, together with the plural pixel electrodes. The color filer may filter light, which is emitted from the backlight assembly 500, into a colored light.

While each of the first substrate 521 and the second substrate 522 may include the aforementioned elements in the above-described exemplary embodiment, the invention may not be limited to the configurations and functions of the elements. In another exemplary embodiment, the second substrate 522 may not include a color filer and instead the first substrate 521 may include a color filer, for example. In another exemplary embodiment, each of the first and second substrates 521 and 522 may further include an orientation film to pre-tilt liquid crystal molecules of the liquid crystal layer LC, for example.

The backlight assembly 500 may be contained in the accommodation member 580 to emit light toward the display panel 520. A structure of the backlight assembly 500 applicable to the curved display device 600 in the above-described exemplary embodiment may be exemplarily configured as follows.

In the above-described exemplary embodiment, the backlight assembly 500 may include a light emitting unit LS and a reflection plate 400. The light emitting unit LS may be disposed on a bottom part 585 of the accommodation member 580. The light emitting unit LS may include a plurality of circuit boards LSB, and a plurality of light source units LSU built in the plural circuit boards LSB.

In the above-described exemplary embodiment, the plural circuit boards SUB may be extended toward the second direction DR2 orthogonal to the first direction DR1, and arranged in the first direction DR1 on the bottom part 585.

The light source units 585 may be built on the plural circuit substrates LSB and provided with power from the plural circuit boards LSB to emit light. In the above-described exemplary embodiment, the plural light source units LSU may be light emitting diodes ("LEDs") of top emission type. Thus, emitting surfaces of the plural light source units LSU may look toward the display panel 520.

A plurality of holes H may be defined in the reflection plate 400 and the plural light source units LSU may be correspondingly accommodated in the plural holes H one by one. Accordingly, light progressing away from the display panel 520 may be reflected on the reflection plate 400 and the reflected light may be provided into the display panel 520.

In the above-described exemplary embodiment, the backlight assembly 500 may further include other elements. In an exemplary embodiment, the backlight assembly 500 may further include a plurality of optical sheets which are disposed between the reflection plate 400 and the display panel 520 to control a path of light generated from the light emitting unit LS. In an exemplary embodiment, the optical sheet may include a diffusion sheet (not shown) and a prism sheet (not shown), for example.

The accommodation member 580 may include the bottom part 585 and a plurality of sidewalls 581 extending from the bottom part 585. In the accommodation member 580, an accommodation space may be defined to contain the backlight assembly 500. In the above-described exemplary embodiment, corresponding to a curve of the display panel 520, the bottom part 585 of the accommodation member 580 may be shaped in a curve and members of the sidewalls 581, which are parallel with the long edges of the accommodation member 580, may partly shaped in curves.

The support member 530 may extend along an edge part 525 of the display panel 520 to combine with the sidewalls 581 of the accommodation member 580. Additionally, the support member 530 may be coupled with the display panel 520 to support the edge part 525 of the display panel 520.

The cover member 510 may cover the edge part 525 of the display panel 520 and combine with the support member 530. Thereby, the cover member 510 may support the edge part 525 of the display panel 520 together with the support member 530. In the above-described exemplary embodiment, the cover member 510 may contact with the top surface of the edge part 525 and the support member 530 may contact with the bottom surface of the edge part 525. Accordingly, the cover member 510 and the support 530 may be helpful in maintaining a curved and flat form of the display panel 520.

The spacers 550 may be disposed between the display panel 520 and the support member 530 to maintain a gap between the display panel 520 and the support member 530. A structure and a function of the spacers 550 will be described in more detail as follows.

Figure 3:
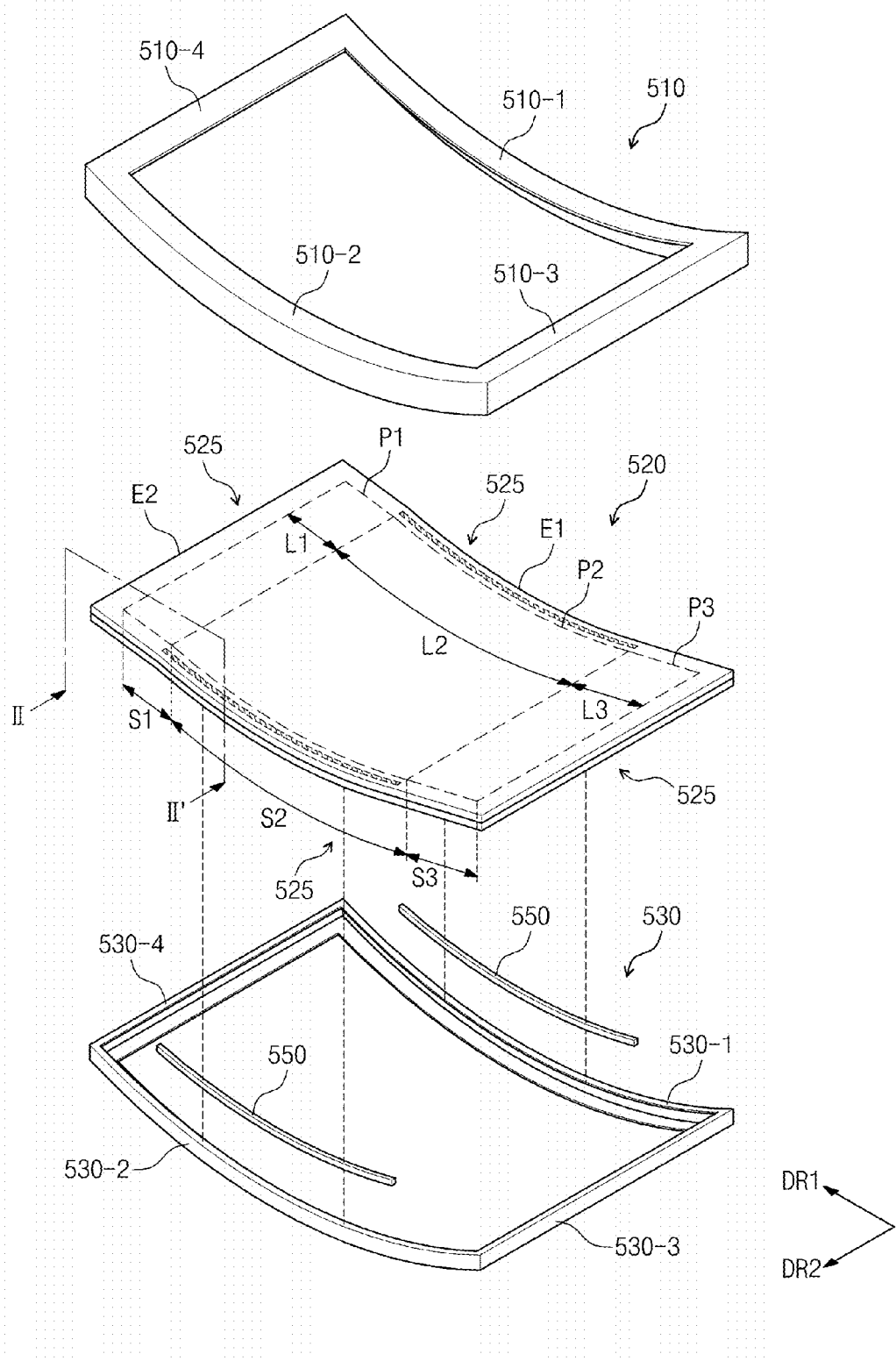
FIG. 3 is an exploded perspective view illustrating a feature of combination between the display panel, the support member, and the cover member shown in FIG. 2.
Figure 4A:
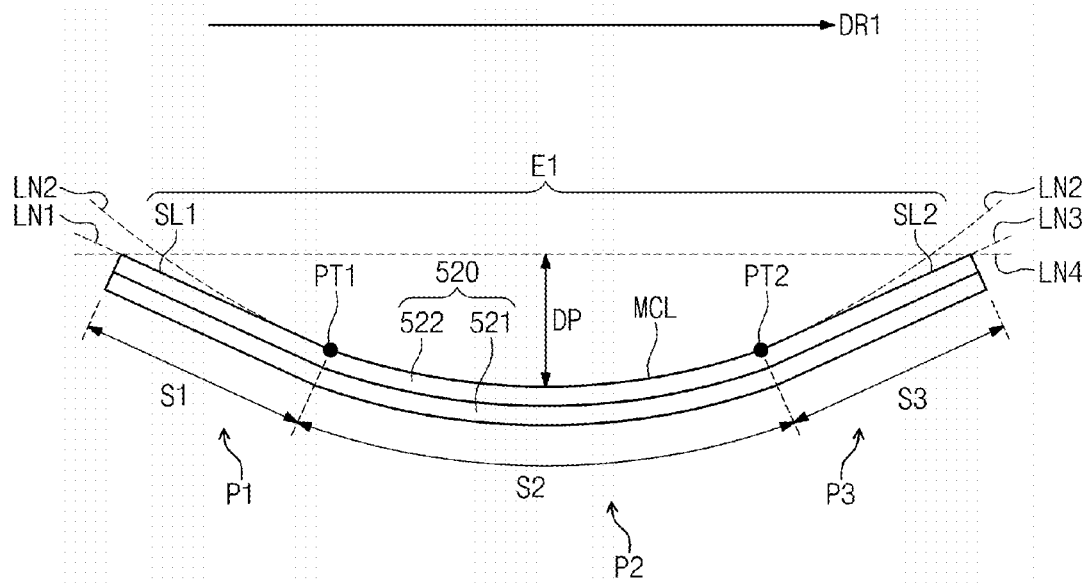
FIG. 4A is a side view illustrating the display panel shown in FIG. 3.

FIG. 3 is an exploded perspective view illustrating a feature of combination between the display panel, the support member, and the cover member shown in FIG. 2. FIG. 4A is a side view illustrating the display panel shown in FIG. 3, and FIG. 4B is a cross sectional view taken along line II-II' shown in FIG. 3.

Figure 4B:
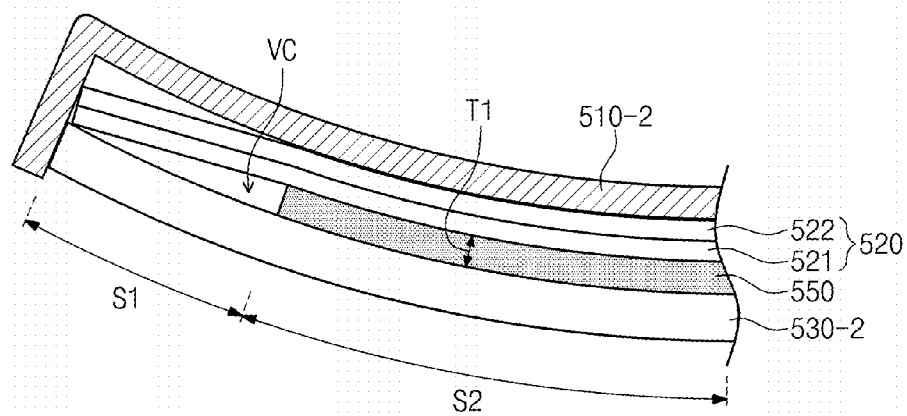
FIG. 4B is a cross sectional view taken along line II-II' shown in FIG. 3.

Referring to FIGS. 3, 4A, and 4B, the long edge E1 and the short edge E2 may be defined in the display panel 520. In the above-described exemplary embodiment, the long edge E1 may be partly curved along the first direction DR1 and the short edge may be extended along the second direction DR2 orthogonal to the first direction DR1.

As the long edge E1 is partly curved, the display panel may include a curved part and a flat part.

In the above-described exemplary embodiment, the first segment S1, the second segment S2, and the third segment S3 may be defined in sequence along the long edge E1 and the spacers 550 may be placed in correspondence with the second segment S2 of the first to third segments S1, S2, and S3. Accordingly, the spacers 550 may be placed between the support member 530 and a part of the display panel 520 which corresponds to the second segment S2, and a vacuum cavity VC may be defined between the support member 530 between parts of the display panel 520 which correspond to the first and third segments S1 and S3.

In the second segment S2, the curved form of the display panel 520 may be maintained by the spacers 550 and the support member 530. In more detail, before the display panel 520 is combined with the support member 530, the display panel 520 may be shaped in a flat from corresponding to all segments. After the display panel 520 is combined with the support member 530 while interposing the spacers 550 between them, the display panel 520 may make contact with the spacers 550 in the second segment S2, and thereby have a curved form by a force maintained by the support member 530.

Contrarily, in the first and third segments S1 and S3, as the display panel 520 is isolated from the support member 539 while interposing the vacuum cavity VC between them, the force supporting the display panel 520 by the support member 530 may be removed. Then, the display panel 520 may be spread out to be flattened in the first and second segments S1 and S3.

Accordingly, the display panel 520 may include a first flat part P1 corresponding to the first segment S1, a curved part P2 corresponding to the second segment S2, and a second flat part P3 corresponding to the third segment S3. The curved part P2 may be shaped in a first curvature radius and the first and second flat parts P1 and P3 may be shaped in flat forms.

Additionally, the long edge E1 may be defined as a first straight line SL1 in the first segment S1, a second straight line SL2 in the third segment S3, and a curved line MCL in the second segment S2.

In the above-described exemplary embodiment, the display panel 520 may be flattened in the first and third segments S1 and S3. In another exemplary embodiment, the display panel 520 may be shaped in at least one of a flat form and a curve, which is provided in a second curvature radius larger than the first curvature radius, in the first and third segments S1 and S3.

Assuming a first imaginary line LN1 extending from the first straight line SL1, a second imaginary line LN3 extending from the second straight line SL2, and an imaginary curved line LN2 extending from the curved line MCL, the first and second imaginary lines LN1 and LN3 may be straight lines and the imaginary curved line LN2 may be a curve.

In the above-described exemplary embodiment, the curved line MCL may meet the first straight line SL1 at a first point PT1 and meet the second straight line SL2 at a second point PT2. In this case, the first straight line SL1 may be placed on a contact defined on the first point PT1 between the imaginary curved line LN2 and the curved line MCL. In an exemplary embodiment, the first straight line SL1 maybe a tangent line of the imaginary curved line LN2 and the curved line MCL at the first point PT1. Similarly, the second straight line SL2 may be placed on a contact defined on the second point PT2 between the imaginary curved line LN2 and the curved line MCL. In an exemplary embodiment, the second straight line SL2 maybe a tangent line of the imaginary curved line LN2 and the curved line MCL at the second point PT2.

Different from exemplary embodiments of the invention, when the first and second straight lines SL1 and SL2 are connected with the curved line MCL and the imaginary curved line LN2 in folded forms on side view, physical stress may be concentrated on the display panel 520 in correspondence with positions where the first and second straight lines are connected with the curved line MCL. In the above-described exemplary embodiment, since the first and second straight lines SL1 and SL2 are connected with the curved line MCL and the imaginary curved line LN2 in the form of a contact, it may be allowable to prevent the physical stress from localizing toward a part of the display panel 520 which corresponds to positions of the first and second points PT1 and PT2.

In the above-described exemplary embodiment, the first flat part P1 may be symmetrical to the second flat part P3 while interposing the curved part P2 between the first flat part P1 and the second flat part P3. Accordingly, a first length of the first segment S1 may be substantially identical to a third length L3 of the third segment L3

In the above-described exemplary embodiment, the reason that the display panel 520 has the first and second flat parts P1 and P3 will be comprehensible by the following description. Different from the above-described exemplary embodiment, when the whole body of the display panel 520 is uniformly curved in a predetermined curvature radius, physical stress may be concentrated on edge parts 525-1 and 525-2 of the display panel 520 in correspondence with the first and third segments S1 and S3. Because of the physical stress, light emitted from the backlight assembly 500 (see FIG. 2) may be differentiated in refraction index by its propagation directions, while passing through base substrates such as glass substrates which are included in the first and second substrates 521 and 522, to result in retardation for the light. It is desirable for the base substrates of the first and second substrates 521 and 522 to have non-optical characteristics to the light emitted from the backlight assembly, whereas the retardation due to the physical stress may be generated. As a result, although the display panel 520 is even driven with a uniform luminance throughout the display area DA (see FIG. 1A), an area adjacent to the edge parts 525 of the display area DA may be different from the peripheral areas in luminance.

However, as shown in exemplary embodiments of the invention, when the display panel 520 includes the first and second flat parts P1 and P3 in the first and third segments S1 and S3, the physical stress to the edge parts 525 by the first and second flat parts P1 and P3 may be reduced thereat. Accordingly, it may be allowable to prevent retardation for light which is transmitted through the edge parts 525, and minimize non-uniformity of luminance in the display area due to the retardation.

In the above-described exemplary embodiment, for the purpose of minimizing the non-uniformity of luminance in the display area DA, it may be necessary to properly set occupation rates of the first and third segments S1 and S3 in the area of the first to third segments S1, S2, and S3. When the occupation rates are optimized, the physical stress concentrated on the edge parts 525 may be minimized to prevent the non-uniformity of luminance in the display area.

If a ratio between the first and third lengths, L1 and L3, and a half of the first to third lengths, L1, L2, and L3, is defined as a non-supporting segment rate, the non-supporting segment rate may be about 3 percent (%) to about 30% in the above-described exemplary embodiment.

Different from exemplary embodiments of the invention, when the non-supporting segment rate is lower than about 3%, it may less effective in reducing physical stress to the display panel 520 by the first and second flat parts P1 and P3. Additionally, different from exemplary embodiments of the invention, when the non-supporting segment rate is higher than about 30%, it may be sufficiently effective in minimizing physical stress to the display panel 520, but a rate of the curved part P2 against the first and second flat parts P1 and P3 may be smaller to cause an optimum curvature of the display panel 520 for a viewer to be difficult.

Table 1 shows the maximum value of shear stress concentrated on the display panel 520 in accordance with the non-supporting segment rate. As references, it is assumed that the display panel 520 is sized in about 48 inches and a length of the long edge of the display panel 520 is about 1054 millimeters (mm).

TABLE 1

| Classification | Non-supporting segment rate | | | | |
| --- | --- | --- | --- | --- | --- |
|  | 0% | 4.74% | 9.49% | 18.90% | 28.46% |
| The maximum value of shear stress to the display panel (MPa) | 34.9 | 11.7 | 8.3 | 7.9 | 7.6 |

Referring to Table 1, when the non-supporting segment rate is about 0%, i.e., when the spacers 550 supporting the display panel 520 are excluded to make the display panel 520 curved with a constant curvature radius in the first to third segments S1, S2, and S3, the shear stress to the display panel 520 may be maximized at 34.9 MPa.

As like the exemplary embodiment aforementioned, when the non-supporting segment rate is about 4.74%, the shear stress to the display panel 520 may be maximized at about 11.7 MPa. Additionally, as the non-supporting segment rate becomes higher than about 4.74% and further increases, the maximum value of the shear stress to the display panel 520 may be lowered.

Otherwise, when the non-supporting segment rate is less than about 3%, the shear stress to the display panel 520 may be maximized over about 15 MPa. Accordingly, by adjusting the non-supporting segment rate within the range of about 3% to about 30%, it may be allowable to minimize the shear stress against the display panel 520 to easily prevent the non-uniformity of luminance in the display area of the display panel 520. In the above-described exemplary embodiment, the display panel 520 may be combined with the cover member 510, the support member 530, and the spacers 550 to maintain its shape.

In the above-described exemplary embodiment, the support member 530 may include a first supporting part 530-1, a second supporting part 530-2, a third supporting part 530-3, and a fourth supporting part 530-4. The first and second supporting parts 530-1 and 530-2 may support the edge part 525 which is parallel with the long edge E1 of the display panel 520. The third and fourth supporting parts 530-3 and 530-4 may support the edge part 525 which is parallel with the short edge E2 of the display panel 520.

If the support member 530 is provided in the aforementioned structure, the third and fourth supporting parts 530-3 and 530-4 may extend along the second direction DR2 in correspondence with a shape of the short edge E2 of the display panel 520. The first and second supporting parts 530-1 and 530-2 may be curved along the first direction DR1 in correspondence with a shape of the long edge E1 of the display panel 520.

In more detail, the first and second supporting parts 530-1 and 530-2 may be curved in a constant curvature radius along the first direction DR1. In the above-described exemplary embodiment, the first and second supporting parts 530-1 and 530-2 may be substantially identical to a part, which corresponds to the second segment S2 in the display panel 520, in curvature radius.

The cover member 510 may include a first covering part 510-1, a second covering part 510-2, a third covering part 510-3, and a fourth covering part 510-4. The first and second covering parts 510-1 and 510-2 may cover the edge part 525 which corresponds to the long edge E1 of the display panel 520. The third and fourth covering parts 510-3 and 510-4 may cover the edge part 525 which corresponds to the short edge E2 of the display panel 520.

The third and fourth covering parts 510-3 and 510-4 may extend along the second direction DR2 in correspondence with a shape of the short edge E2 of the display panel 520. Otherwise, the first and second covering parts 510-1 and 510-2 may be curved along the first direction DR1 in correspondence with a shape of the long edge E1 of the display panel 520.

In the above-described exemplary embodiment, the first and second covering parts 510-1 and 510-2 may be substantially identical to a part, which corresponds to the second segment S2 of the display panel 520, in curvature radius.

The spacers 550 may be interposed between the display panel 520 and the support member 530. Additionally, the spacers 550 may be placed in correspondence with the second segment S2 of the first to third segments S1, S2, and S3, and extended along the edge part 525 of the display panel 520.

In the above-described exemplary embodiment, the spacers 550 may be linearly shaped on a plane, and provided on the first and second supporting parts 530-1 and 530-2. Additionally, since the spacers 550 contact the support member 530 and the display panel 520, assuming that the spacers 550 are uniformed in thickness, the spacers 550 may be curved along the first direction DR1.

In the above-described exemplary embodiment, the spacer 550 may include a material having optical transparence such as acrylic resin.

A third imaginary line LN4, which connects two edge parts facing each other, and a depth DP of the third imaginary line LN4 at the center of the display panel 520 may be defined. With this condition, a thickness T1 (see FIG. 4B) of the spacer 550 may be about 1% or about 10% of the depth DP, for example.

When a rate of the depth DP in the thickness of the spacer 550 is defined as a depth rate and, different from exemplary embodiments of the invention, the depth rate is less than about 1%, it may be insignificant in reducing physical stress to the display panel 520. Additionally, different from exemplary embodiments of the invention, when the depth rate is higher than about 10%, it may be sufficient in reducing physical stress to the display panel 520. However, it may be difficult to implement an optimum curvature in the display panel 520 for a viewer.

Figure 5A:
FIGS. 5A to 5C illustrate light source extent expressed in the display area in accordance with thicknesses of the spacers shown in FIG. 4B.
Figure 5B:
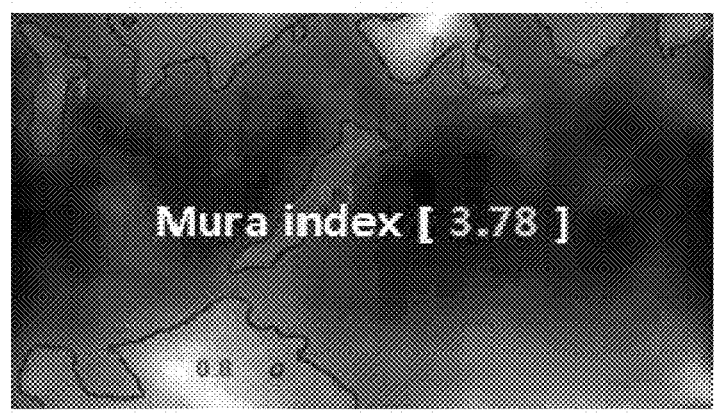
Figure 5C:

FIGS. 5A to 5C illustrate light source extent expressed in the display area in accordance with the thicknesses T1 of the spacers shown in FIG. 4B. As references, the display area of the display panel is sized in about 55 inches and the long edge of the display area is lengthened in about 1210 mm.

Referring to FIGS. 4A, 4B, and 5A, when the thickness T1 of the spacer 550 is about 0.85 mm, a mura index indicated in the display area DA may be about 5.01 and the first and third segments S1 and S3 of the display panel may be about 50 mm. The mura index is a value which is indexed from light source extent generated in the display area DA due to physical stress which is applied to the display panel 520. As the mura index becomes larger, an area brightened by the light source may be larger such that the light source may be higher in visibility.

Additionally, when the display panel 520 is sized in about 55 inches and shaped in a curvature radius about 2500 mm, the depth DP may be about 71.7 mm. Accordingly, when the thickness T1 is about 0.85 mm, the depth rate defined with reference to FIG. 4A may be about 1.19%.

Different from exemplary embodiments of the invention, when the spacers 550 supporting the display panel 520 are excluded to allow the display panel 520 curved with a constant curvature radius in the first to third segments S1, S2, and S3, the mura index arising from the display panel 520 may be about 6.2. As shown from exemplary embodiments of the invention, when the spacers 550 are employed to support the display panel 520, it may be effective in reducing the mura index thereof.

Referring to FIGS. 4A, 4B, and 5B, when the thickness T1 of the spacers 550 is about 1.95 mm, the first and third segments S1 and S3 of the display panel may be about 50 mm and the mura index expressed in the display area DA may be about 3.78.

Additionally, since the depth DP of the display panel 520 is about 71.7 mm, when the thickness T1 is about 1.95 mm, the depth rate defined with reference to FIG. 4A may be about 27.2%.

Referring to FIGS. 4A, 4B, and 5C, when the thickness T1 of the spacer 550 is about 3.80 mm, the mura index expressed in the display area DA may be about 2.70. Additionally, since the depth DP of the display panel 520 is about 71.7 mm, when the thickness T1 is about 3.80 mm, the depth rate defined with reference to FIG. 4A may be about 5.30%.

Summarizing the results shown in FIGS. 5A to 5C, by adjusting the non-supporting segment rate in the range of about 1% to about 10%, it may be allowable to minimize the shear stress, which is applied to the display panel 520, to prevent non-uniformity of luminance in the display area of the display panel 520.

Figure 6:
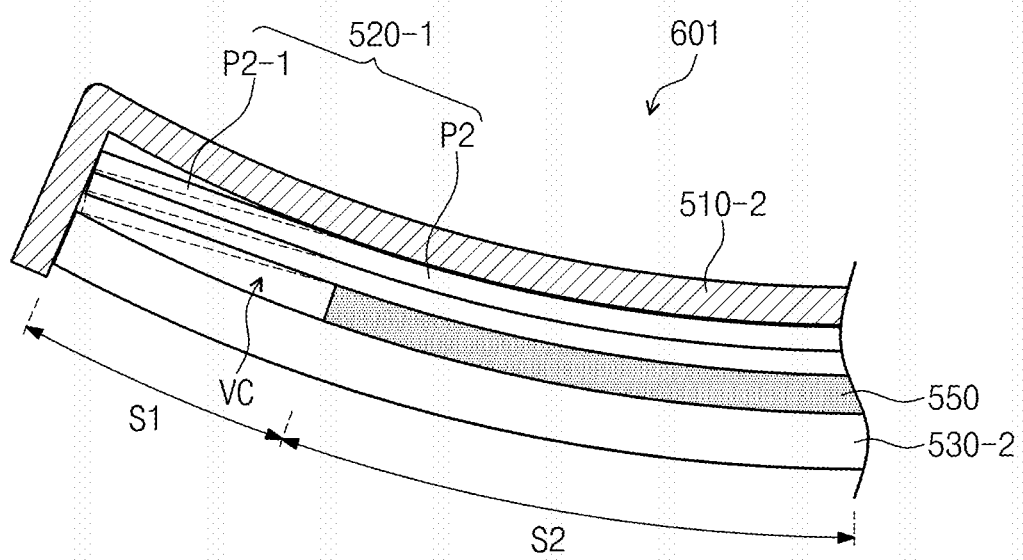
FIG. 6 is a cross sectional view illustrating another exemplary embodiment of a curved display device according to the invention.

FIG. 6 is a cross sectional view illustrating a curved display device 601 according to another exemplary embodiment of the invention. In description with FIG. 6, the aforementioned elements may be indicated by the same reference numerals and will not be further explained in duplication.

In the exemplary embodiment shown in FIGS. 3 and 4B, the display panel 520 is flattened in the first and third segments S1 and S3 and curved in the second segment S2. Otherwise, a display panel 520-1 according to the above-described exemplary embodiment shown in FIG. 6 may have a subsidiary curved part P2-1 in each of a first segment S1 and a third segment (not shown), and have a curved part P2 in a second segment S2.

In the above-described exemplary embodiment, when the curved part P2 is defined as being curved with a first curvature radius, the subsidiary curved part P2-1 may be curved with a second curvature radius which is larger than the first curvature radius. The second curvature radius may be larger than the first curvature radius. In an exemplary embodiment, the first curvature radius may be ranged in about 1 meter (m) to about 10 m, while the second curvature radius may be about 5 to about 100,000 times the first curvature radius.

In the above-described exemplary embodiment like the aforementioned exemplary embodiment, spacers 550 may be placed between a part, which corresponds to the second segment S2 of the display panel 520-1 and a support member 530 and a vacuum cavity may be defined between parts, which corresponds to the first segment S1 and the third segment S3, and the support member 530.

In the above-described exemplary embodiment, a force of the support member 530 to support the display panel 520-1 may be released in correspondence with the first segment S1 and the third segment S3. Accordingly, a curved degree of the display panel in each of the first and third segments S1 and S3 may be smaller than that in the second segment S2. In this configuration, as aforementioned, physical stress to an edge part of the display panel 520-1 may cause light source luminance, which is generated in the display panel 520-1, to be minimized.

Figure 7:
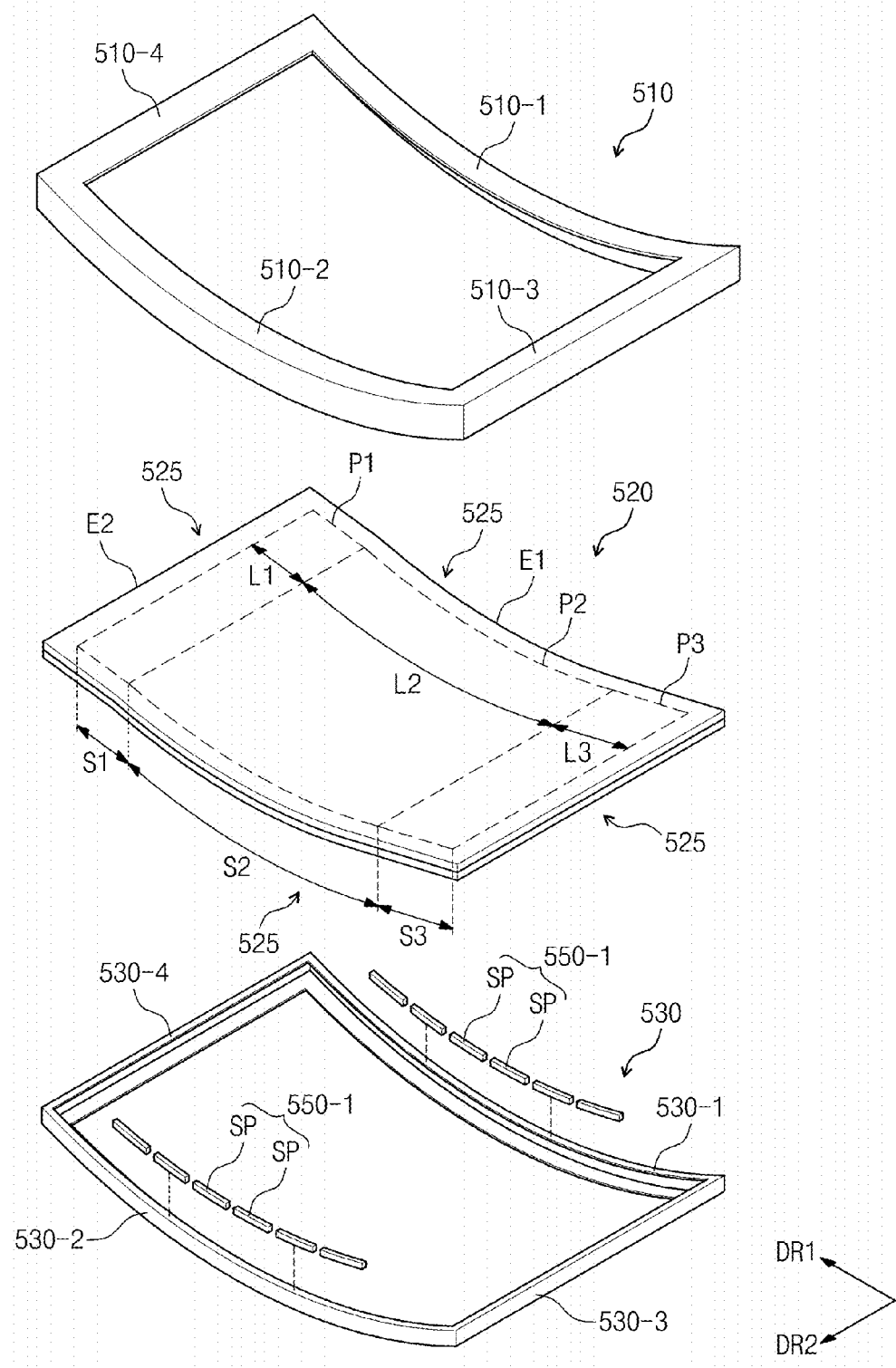
FIG. 7 is a perspective view illustrating another exemplary embodiment of a feature of combination between a display panel, a support member, spacers, and a cover member in a curved display device 602 according to the invention.

FIG. 7 is a perspective view illustrating a feature of combination between a display panel, a support member, spacers, and a cover member in a curved display device 602 according to another exemplary embodiment of the invention. In description with FIG. 6, the aforementioned elements may be indicated by the same reference numerals and will not be further explained in duplication.

In the exemplary embodiment shown in FIG. 3, the spacers 550 may be linearly extended along the edge part 525 of a display panel 520 and curved along the first direction DR1.

Otherwise, in the above-described exemplary embodiment shown in FIG. 7, spaces 550-1 may each include a plurality of spacer parts SP. The plural spacer parts SP may be isolated each other and arranged along the edge part 525 of the display panel 520.

If the spacer 550-1 includes the plural spacer parts SP, it may be permissible to reduce a cost for manufacturing the spacers 550-1. Additionally, it may be allowable to distribute contact points between the spacers 550-1 and the display panel 520, and thereby prevent physical stress from localizing on the display panel 520.

While the invention has been described with reference to exemplary embodiments, it will be apparent to those skilled in the art that various changes and modifications may be made without departing from the spirit and scope of the invention set forth throughout the annexed claim matters. Therefore, it should be understood that the above exemplary embodiments are not limiting, but illustrative, hence all technical things within the annexed claims and the equivalents thereof may be construed as properly belonging to the territory of the invention.

What is claimed is:

1. A curved display device comprising:
   a display panel having a shape, and including a first segment, a second segment, and a third segment which are sequentially defined along an edge in the display panel;
   a support member which is combined with the display panel and supports the curved shape of the display panel; and
   a spacer placed in correspondence with the second segment of the first to third segments and disposed between the display panel and the support member,
   wherein the display panel is curved with a first curvature radius along a first direction in the second segment, and the first and third segments are flat,
   wherein a side of the display panel is defined along the first direction,
   wherein the side of the display panel includes a curved line having the first curvature radius in the second segment, a first straight line in the first segment, and a second straight line in the third segment, the first straight line meets the curved line at a first point, and the second straight line meets the curved line at a second point spaced from the first point, and wherein the first straight line is tangent to the curved line at the first point, and the second straight line is tangent to the curved line at the second point.

2. The curved display device according to claim 1, wherein the spacer is placed between a part, which corresponds to the second segment of the display panel, and the support member, and a vacuum cavity is defined between a part, which corresponds respectively to the first and third segments of the display panel, and the support member.

3. The curved display device according to claim 2, wherein the spacer extends along an edge part of the display panel.

4. The curved display device according to claim 3, wherein the spacer is shaped in a line.

5. The curved display device according to claim 4, wherein the spacer is curved along the first direction.

6. The curved display device according to claim 2, wherein the spacer is provided in plurality, and the plurality of spacers is arranged along an edge part of the display panel.

7. The curved display device according to claim 1, wherein a ratio of each of the first and third segments over a half of the sum of lengths of the first to third segments is ranged from about 3 percent to about 30 percent.

8. The curved display device according to claim 1, wherein an imaginary line is defined to connect two edge parts of the display panel, which face each other, on side, a depth of the imaginary line is defined from a center of the display panel to the imaginary line on the side, and a thickness of the spacer is about 1 percent to about 10 percent of the depth.

9. The curved display device according to claim 1, wherein the first and third segments are defined in sequence along a long edge of the display panel.

10. The curved display device according to claim 9, wherein at least a part of the long edge is shaped with a first straight line in the first segment, the long edge is curved with the first curvature radius in the second segment, and at least a part of the long edge is shaped with a second straight line in the third segment.

11. The curved display device according to claim 1, wherein the first segment is symmetrical to the second segment, and
the curved part is disposed between the first and second segment.

12. The curved display device according to claim 9, wherein the display panel comprises:

a subsidiary curved part placed in each of the first and third segments and curved along the first direction with a second curvature radius which is larger than the first curvature radius; and
a curved part placed in the second segment and curved along the first direction with the first curvature radius.

13. The curved display device according to claim 1, wherein the display panel comprises two glass substrates combined face to face each other; and a liquid crystal layer disposed between the two glass substrates.

14. The curved display device according to claim 9, wherein the support member comprises a supporting part extending along the long edge of the display panel and support at least one edge of the display panel, and
wherein the supporting part is curved with the first curvature radius.

15. The curved display device according to claim 9, further comprising a cover member which covers the display panel and in which an opening corresponding to a display area where an image is displayed in the display panel is defined,
wherein the cover member is curved with the first curvature radius and extends along the long edge of the display panel, including a covering part which covers at least one edge of the display panel.

16. The curved display device according to claim 1, wherein the spacer has an optical transparence.

17. The curved display device according to claim 1, wherein the spacer contacts the display panel and the support member.

* * * * *